Patented Aug. 23, 1932

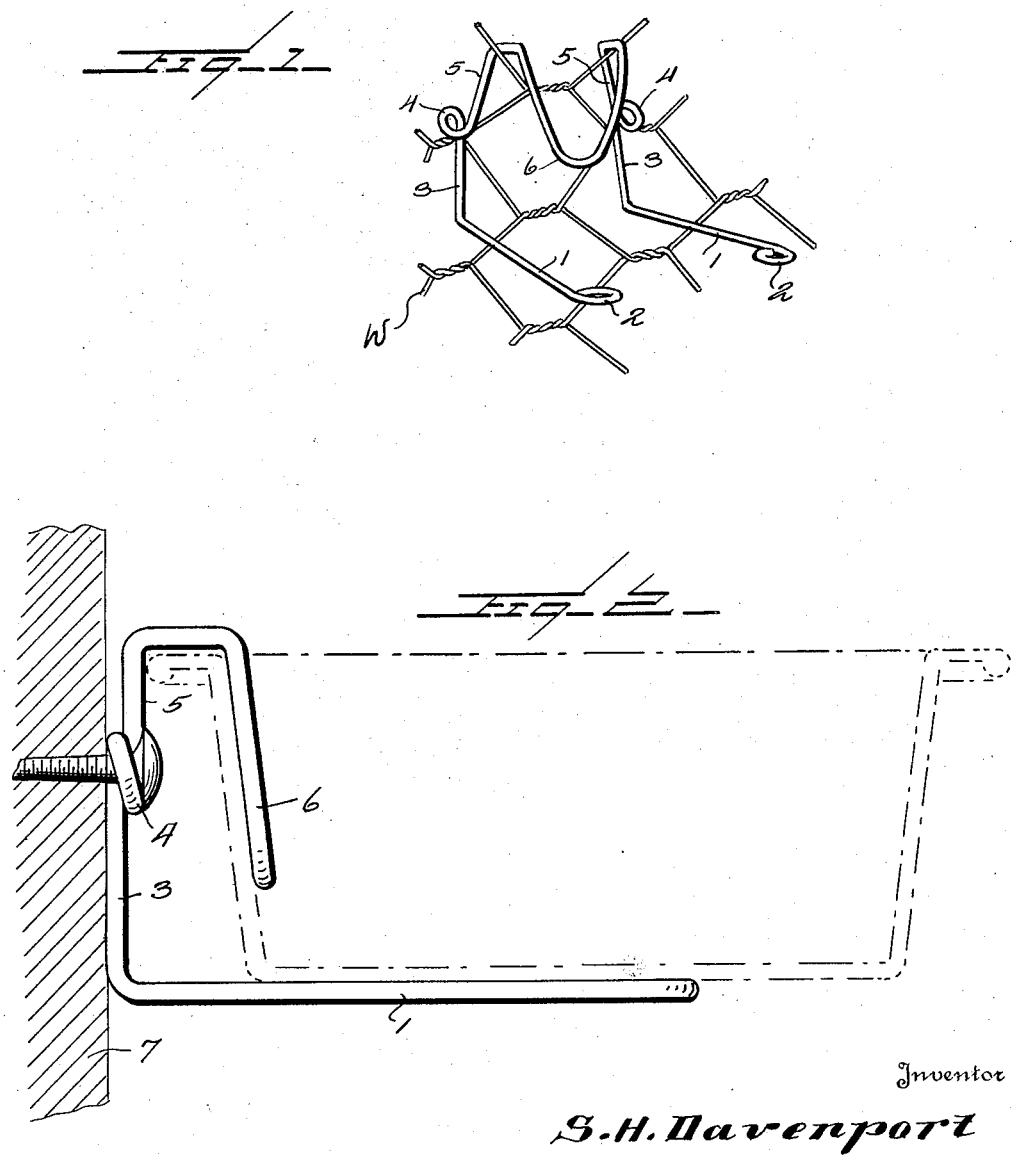

1,873,297

UNITED STATES PATENT OFFICE

SHERMAN H. DAVENPORT, OF WATERTOWN, NEW YORK

DISH HOLDER

Application filed March 29, 1930. Serial No. 440,010.

This invention relates to a dish holder and has for its object to provide a device of this kind for holding feed and water dishes for animals or the like off the ground, thus maintaining the dishes in a sanitary condition.

It is also an object of the invention to provide a device of this kind especially designed for use in connection with raising of foxes and kindred animals.

The invention consists in the details of construction and in the combination and arrangement of the several parts of my improved dish holder whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawing, wherein:—

Figure 1 is a view in perspective illustrating a dish holder constructed in accordance with an embodiment of my invention and applied to a wire fabric;

Figure 2 is a view in side elevation of the device as herein disclosed anchored to a frame member or the like, the associated dish being indicated by broken lines.

My improved holder, as herein disclosed, is formed from a single length of wire of requisite gauge and which is formed to provide substantially parallel arms 1 having their extremities inwardly bent to provide eye members 2. The opposite end portions of the arms 1 are continued by the substantially perpendicularly related arms 3 which, at substantially their longitudinal centers, are formed with the eye members 4. While these eye members 4 are herein disclosed as substantially circular, they may be otherwise provided as preferred.

The outer ends of the arms 3 are continued by the relatively short arms 5 which are connected by the substantially U-shaped cross member 6, said member 6 being disposed in a direction inwardly of the arms 3.

When my improved device is employed with a wire fabric wall W the various arms of the device are threaded through the meshes of the wall W, as illustrated in the accompanying drawing, with the arms 1 substantially vertically disposed and the cross member 6 downwardly directed.

In this position a dish may have a marginal portion readily rested upon the arms 1 with the cross member 6 engaging from within the side flange of the dish, thus holding the dish effectively in position for ready access by the animal yet with the dish free of the ground. The eye members 4 materially facilitate the maintenance of the device in proper applied position with respect to the wall W as does also the arms 5.

The device, however, can be readily secured in desired position through the medium of nails or the like directed through the eye members 4 and engaged within the frame members 7 or other kindred support.

From the foregoing description it is thought to be obvious that a dish holder constructed in accordance with my invention is particularly well adapted for use by reason of the convenience and facility with which it may be assembled and employed, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

A receptacle holder consisting of a single piece of wire bent into a substantially U-shape with its free ends extending substantially at right angles to the plane of the body thereof with the bight of the U-shaped portion reversely bent to provide a hook portion having loops adjacent the hook portion adapted to receive fastening devices whereby said holder may be optionally supported from a wire fabric fence or from a wall.

In testimony whereof I hereunto affix my signature.

SHERMAN H. DAVENPORT.